(12) United States Patent
Shiba

(10) Patent No.: US 10,644,524 B2
(45) Date of Patent: May 5, 2020

(54) ELECTRONIC DEVICE AND METHOD FOR CHARGING A BATTERY

(71) Applicant: CANON KABUSHIKI KAISHA, Tokyo (JP)

(72) Inventor: Hidenori Shiba, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 108 days.

(21) Appl. No.: 15/379,824

(22) Filed: Dec. 15, 2016

(65) Prior Publication Data

US 2017/0179734 A1 Jun. 22, 2017

(30) Foreign Application Priority Data

Dec. 18, 2015 (JP) ................. 2015-248027

(51) Int. Cl.
*H02J 7/00* (2006.01)

(52) U.S. Cl.
CPC ............ *H02J 7/007* (2013.01); *H02J 7/0045* (2013.01); *H02J 7/00034* (2020.01); *H02J 7/00045* (2020.01)

(58) Field of Classification Search
CPC .................................................. H02J 7/007
USPC ......................................................... 320/106
See application file for complete search history.

(56) References Cited

U.S. PATENT DOCUMENTS

| 8,183,823 | B2 * | 5/2012 | Neumiller | A61N 1/3931 320/106 |
|---|---|---|---|---|
| 8,633,801 | B2 * | 1/2014 | Iwai | G06F 1/26 320/106 |
| 2003/0132732 | A1 * | 7/2003 | Thomas | H02H 9/042 320/134 |
| 2009/0009176 | A1 * | 1/2009 | Nakao | G01R 31/3655 324/432 |
| 2012/0212183 | A1 * | 8/2012 | Yamada | H02J 3/32 320/126 |
| 2013/0187610 | A1 * | 7/2013 | Hayashi | H02J 7/00 320/118 |
| 2014/0028089 | A1 * | 1/2014 | Luke | B60L 1/003 307/9.1 |
| 2015/0221993 | A1 * | 8/2015 | Wang | H01M 10/425 429/92 |

FOREIGN PATENT DOCUMENTS

JP 2009-273219 A 11/2009

* cited by examiner

*Primary Examiner* — Yalkew Fantu
(74) *Attorney, Agent, or Firm* — Carter, DeLuca & Farrell LLP

(57) ABSTRACT

An electronic device includes a charge unit that charges a battery included in a battery device with power from a connected external device, an authentication unit that authenticates the battery device, a storage unit that stores a last authentication result by the authentication unit of the battery device, and a control unit that controls a charging method by the charge unit based on the authentication result stored in the storage unit and a type of the external device when a voltage level of the battery reaches a first voltage level.

20 Claims, 8 Drawing Sheets

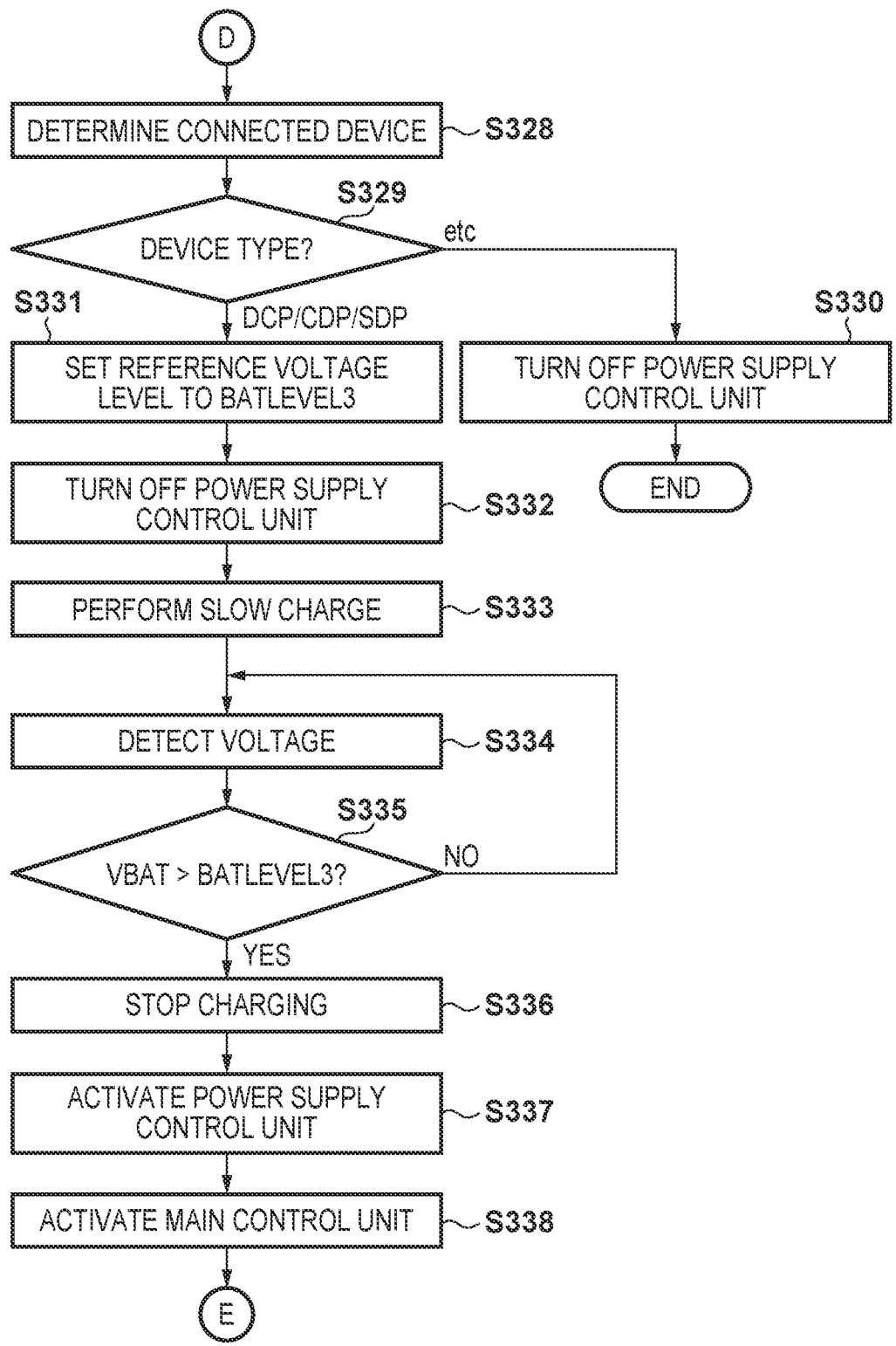

FIG. 4

| AUTHENTICATION RESULT INFORMATION | CONNECTED DEVICE | OVER BATLEVEL1 | OVER BATLEVEL2 | OVER BATLEVEL3 |
|---|---|---|---|---|
| AUTHENTICATION OK STATE | DCP, CDP | QUICK | QUICK | QUICK |
| | SDP | SLOW | HighPower: QUICK / LowPower: SLOW | STOP |
| | etc | | STOP | STOP |
| UNAUTHENTICATED STATE | DCP, CDP | | SLOW | AUTHENTICATION OK STATE: QUICK / AUTHENTICATION NG STATE: STOP |
| | SDP | | SLOW | AUTHENTICATION OK STATE: HighPower QUICK / LowPower SLOW ; AUTHENTICATION NG STATE: STOP |
| | etc | | | STOP |
| AUTHENTICATION NG STATE | ALL | | | STOP |

ELECTRONIC DEVICE AND METHOD FOR CHARGING A BATTERY

BACKGROUND

Field of the Invention

Aspects of the present invention generally relate to an electronic device capable of charging a battery device and a method of controlling the electronic device.

Description of the Related Art

A portable electronic device can operate using power from a battery device. When it is assumed that the battery device is charged by the electronic device, it is assumed that a maker designs the electronic device such that charging control suitable for a genuine battery device is performed. This is because if charging control suitable for the genuine battery device can be performed, the battery device can be set in a fully charged state in a minimal time. However, a counterfeit battery device which is a battery device counterfeiting the genuine battery device may not satisfy a rating assumed by the electronic device. Therefore, charging control suitable for the genuine battery device may not be preferable for the counterfeit battery device.

In order to improve safety of the electronic device, it is assumed that a battery authentication process for authenticating whether a battery device connected to the electronic device is the genuine battery device is performed between the electronic device and the battery device. If it can be determined that the battery device connected to the electronic device is not the genuine battery device before charging the battery device, it is possible to stop charging the counterfeit battery device and improve the safety of the electronic device. Japanese Patent Laid-Open No. 2009-273219 describes a technique of performing, between a charging circuit and a battery device, an authentication process for authenticating whether a battery connected to the charging circuit is a rechargeable battery before quick charge of the battery is performed.

Power of the battery device is utilized for the battery authentication process performed between the electronic device and the battery device. Therefore, when the remaining battery level of the battery device connected to the electronic device is zero or extremely low, the electronic device cannot perform the battery authentication process. In this case, the electronic device cannot even authenticate whether the battery device connected to the electronic device is the genuine battery device before charging the battery device. There is considered, as a method of solving this problem, a method of charging the battery device by the electronic device with a sufficiently small charging current to secure safety even if the battery device is not the genuine battery device.

In the method of charging the battery device with the sufficiently small charging current, however, a long time is required until power capable of performing the battery authentication process is accumulated in the battery device. When the battery device is the genuine battery device, in particular, a long time is required until charging control suitable for the genuine battery device is started.

SUMMARY

According to an aspect of the present invention, it is possible to shorten a charging time of a battery device connected to an electronic device.

According to an aspect of the present invention, there is provided an electronic device comprising: a charge unit that charges a battery included in a battery device with power from a connected external device; an authentication unit that authenticates the battery device; a storage unit that stores a last authentication result by the authentication unit of the battery device; and a control unit that controls a charging method by the charge unit based on the authentication result stored in the storage unit and a type of the external device when a voltage level of the battery reaches a first voltage level.

Further features and aspects of the present invention will become apparent from the following description of exemplary embodiments.

BRIEF DESCRIPTION OF THE DRAWINGS

FIG. 3D is a flowchart illustrating the charging control process performed in the electronic device 101;

FIG. 4 is a state table illustrating the charging control process performed in the electronic device 101.

DESCRIPTION OF THE EMBODIMENTS

Exemplary embodiments, features, and aspects of the present invention will be described below with reference to the drawings. However, aspects of the present invention are not limited to the following embodiments.

First Embodiment

Figure 1:
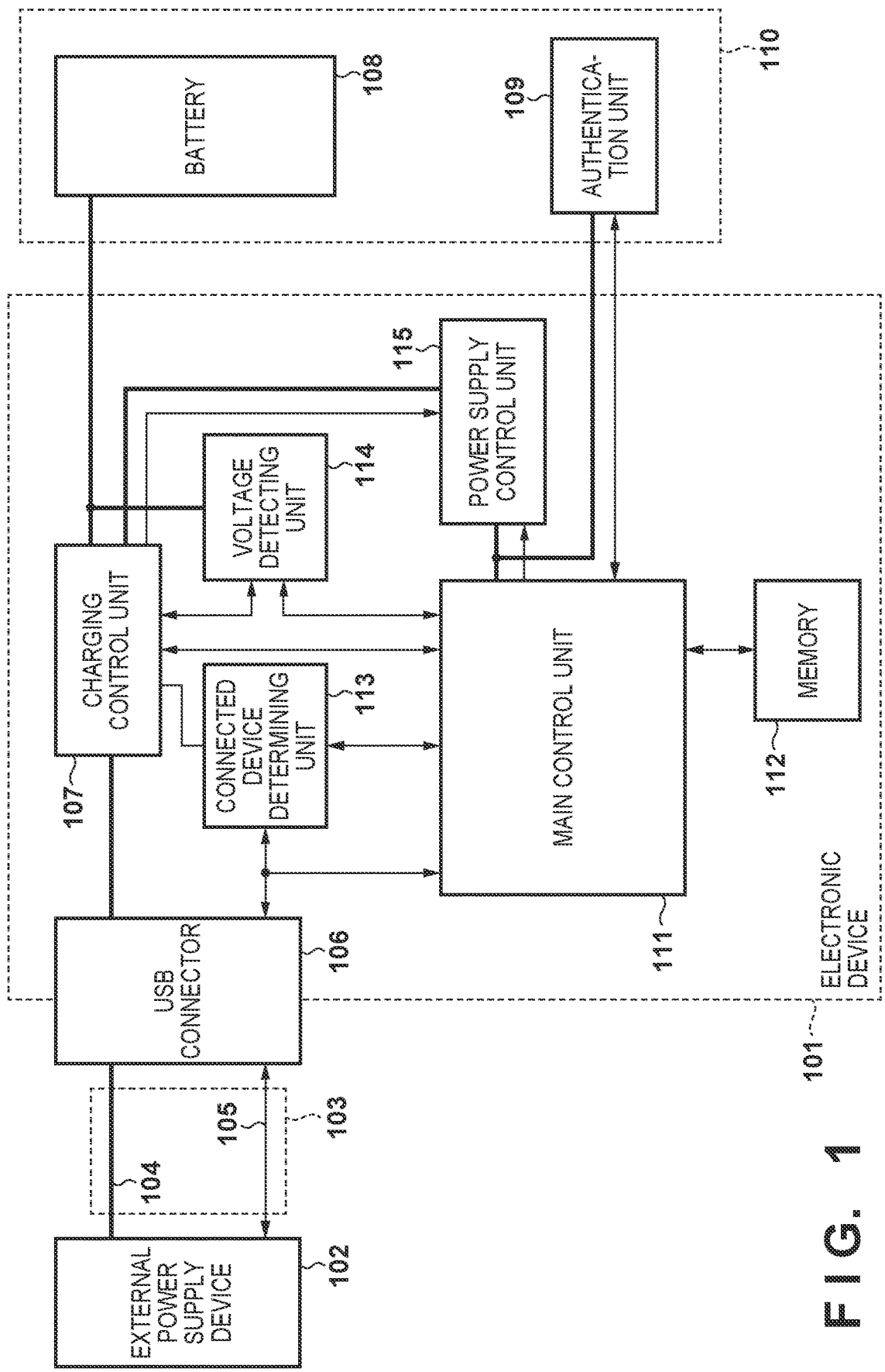
FIG. 1 is a block diagram illustrating components included in an electronic device 101 and an components included in a battery device 110.

FIG. 1 is a block diagram illustrating components included in an electronic device 101 and components included in a battery device 110. The electronic device 101 can act as, for example, an image capture apparatus (such as a digital camera) or a mobile phone.

In FIG. 1, the electronic device 101 is connected to an external power supply device 102 via a USB cable 103. The external power supply device 102 is a power supply device which supplies power to the electronic device 101 via the USB cable 103. In the first embodiment, the type of external power supply device 102 is a DCP (dedicated charging port), CDP (charging downstream port), SDP (standard downstream port), or etc. The DCP, CDP, and SDP are defined in USB Battery Charging Specification Revision 1.2 (a BCS 1.2 standard hereinafter). In the first embodiment, the DCP is an external power supply device which includes a USB port capable of performing quick charge of a battery without performing data communication and enumeration. The CDP is an external power supply device which includes a USB port capable of performing quick charge of a battery before enumeration is performed and performing data communication after the completion of enumeration. The SDP is an external power supply device which includes a USB port defined in USB 2.0 (Universal Serial Bus Specification Revision 2.0) and whose charging current can be known by performing enumeration. The etc is a USB port other than predetermined types (in the first embodiment, the predetermined types includes the DCP, CDP, and SDP). Note that in the first embodiment and other embodiments, enumeration means enumeration complying with a USB standard.

The USB cable 103 is a cable which connects the electronic device 101 and the external power supply device 102 via a USB. The USB cable 103 is made of a VBUS 104 serving as power wiring for supplying power from the external power supply device 102 to the electronic device 101, data lines 105 (including a D+ line and a D− line), and GND (ground). The data lines 105 are used to determine the type of external power supply device 102, and are also used for data communication between the external power supply device 102 and a main control unit 111. A USB connector 106 is a connector for connecting the electronic device 101 and the external power supply device 102 via the USB cable 103.

A charging control unit 107 is connected to the VBUS 104 of the USB connector 106, and performs control for charging power supplied from the VBUS 104. The battery device 110 is removable from the electronic device 101, and includes a battery 108 and an authentication unit 109. The battery 108 can be charged, and supplies a power supply voltage for operating the electronic device 101. The main control unit 111 uses the authentication unit 109 to determine whether the battery 108 is a genuine battery device assumed to be used by the electronic device 101. When the battery device 110 is connected to the electronic device 101, the battery 108 is connected to the charging control unit 107.

The main control unit 111 is made of one or more microcomputers or microprocessors, and is configured to control all the components in the electronic device 101. The main control unit 111 performs, between the main control unit 111 and the authentication unit 109, a battery authentication process for authenticating whether the battery device 110 connected to the electronic device 101 is a genuine battery device. Power used when the battery authentication process is performed is supplied from the battery 108 to the main control unit 111 and the authentication unit 109. That is, when the battery authentication process is performed between the main control unit 111 and the authentication unit 109, the charging control unit 107 supplies power supplied from the battery 108 to a power supply control unit 115, and the power supply control unit 115 supplies power from the charging control unit 107 to the main control unit 111 and the authentication unit 109.

Authentication result information stored in a memory 112 is information indicating an unauthenticated state in an initial state. Based on a result of the battery authentication process performed between the main control unit 111 and the authentication unit 109, the main control unit 111 changes the authentication result information stored in the memory 112 to information indicating an authentication OK state or an authentication NG state. In the first embodiment and other embodiments, a state before the battery authentication process is performed is called the unauthenticated state, a state in which the battery authentication process succeeds is called the authentication OK state, and a state in which the battery authentication process fails is called the authentication NG state. When the state in which the battery authentication process succeeds is obtained (when the authentication result information indicates the authentication OK state), it is determined that the battery device 110 is the genuine battery device. When the state in which the battery authentication process fails is obtained (when the authentication result information indicates the authentication NG state), it is determined that the battery device 110 is an non-genuine battery device (including a counterfeit battery device). When the battery device 110 is removed from the electronic device 101, the main control unit 111 deletes the authentication result information stored in the memory 112 and changes it to the information indicating the unauthenticated state. When the authentication result information is changed to the information indicating the unauthenticated state, the main control unit 111 and the authentication unit 109 are set in a state in which the battery authentication process is not performed.

A connected device determining unit 113 is connected to the data lines 105, and can determine the type of external power supply device 102 connected to the electronic device 101 by using the data lines 105. In the first embodiment, the connected device determining unit 113 detects whether the external power supply device 102 connected to the electronic device 101 is the DCP, CDP, SDP, or etc. For example, based on the voltage value of the D− line measured when a predetermined voltage is applied to the D+ line and the voltage value of the D− line measured when a predetermined voltage is applied to the D− line, the connected device determining unit 113 can determine the type of external power supply device 102. The connected device determining unit 113 generates determination result information indicating whether the type of external power supply device 102 is the DCP, CDP, SDP, or etc, and stores the generated determination result information in a memory in the connected device determining unit 113. The connected device determining unit 113 can communicate with the main control unit 111. The main control unit 111 can know the type of external power supply device 102 connected to the electronic device 101 by obtaining, from the connected device determining unit 113, the determination result information from the memory in the connected device determining unit 113.

A voltage detecting unit 114 is connected to the battery 108 when the battery device 110 is connected to the electronic device 101. The voltage detecting unit 114 detects the voltage of the battery 108 and determines whether the detected voltage exceeds BATLEVEL1, BATLEVEL2, or BATLEVEL3. The voltage detecting unit 114 notifies the main control unit 111 and the charging control unit 107 of whether the voltage of the battery 108 exceeds BATLEVEL1, BATLEVEL2, or BATLEVEL3.

The power supply control unit 115 supplies power to all the components in the electronic device 101 when the electronic device 101 is in a normal operation mode. Note that the normal operation mode may be an image capture operation mode capable of performing image capture or a playback operation mode capable of playing back an image capture image when, for example, the electronic device 101 is a digital camera. For example, when a power supply is OFF, the electronic device 101 is configured such that power is not supplied to blocks except for a block such as a clock unit which measures a time which needs to operate even when the power supply is OFF, and reduces power consumption when the power supply is OFF to make the battery 108 last longer.

The power supply control unit 115 is connected to the charging control unit 107, and can receive power supplied from the charging control unit 107. Under an instruction from the charging control unit 107, the power supply control unit 115 can start or stop supplying power to all the components of the electronic device 101. Note that the charging control unit 107 supplies, to the power supply control unit 115, power from one or both of the external power supply device 102 and the battery 108.

BATLEVEL1, BATLEVEL2, and BATLEVEL3 used in a charging control process performed in the first embodiment will now be described.

Each of BATLEVEL1, BATLEVEL2, and BATLEVEL3 indicates a voltage level. The relationship among BATLEVEL1, BATLEVEL2, and BATLEVEL3 is, for example, BATLEVEL1<BATLEVEL2<BATLEVEL3<a fully charged voltage. The fully charged voltage is at a voltage level at which the battery 108 is set in a fully charged state.

When the voltage of the battery 108 exceeds BATLEVEL1, the main control unit 111 can perform at least a process of determining whether the authentication result information obtained from the memory 112 is the authentication OK state, the authentication NG state, or the unauthenticated state, and a process of determining whether the type of external power supply device 102 is the DCP, CDP, SDP, or etc.

When the voltage of the battery 108 exceeds BATLEVEL2, the main control unit 111 can perform at least a process executable at BATLEVEL1, a process of performing enumeration between the main control unit 111 and the external power supply device 102, and a process of determining whether a power supply capability of the external power supply device 102 is "High Power" or "Low Power".

When the voltage of the battery 108 exceeds BATLEVEL3, the main control unit 111 can perform at least a process executable at BATLEVEL1, a process executable at BATLEVEL2, and the battery authentication process for determining whether the battery device 110 is the genuine battery device.

For example, when the battery 108 is a 1-cell battery, the voltage levels of BATLEVEL1, BATLEVEL2, and BATLEVEL3 are BATLEVEL1=3.40 V, BATLEVEL2=3.55 V, and BATLEVEL3=3.60 V. Further, in this case, the fully charged voltage is, for example, 4.20 V. However, BATLEVEL1, BATLEVEL2, BATLEVEL3, and the fully charged voltage are not limited to 3.40 V, 3.55 V, 3.60 V, and 4.20 V as long as BATLEVEL1<BATLEVEL2<BATLEVEL3<the fully charged voltage is maintained.

The charging control process performed in the electronic device 101 will now be described with reference to FIGS. 3A, 3B, 3C, 3D, and 3E. The electronic device 101 starts the charging control process when, for example, the external power supply device 102 and the electronic device 101 are connected via the USB cable 103 in a state in which the battery device 110 is connected to the electronic device 101. The electronic device 101 also starts the charging control process when, for example, the battery device 110 is connected to the electronic device 101 in a state in which the electronic device 101 and the external power supply device 102 are connected via the USB cable 103.

In step S301, the charging control unit 107 receives, from the external power supply device 102, a current (for example, 100 mA at maximum) at the first current level and a predetermined voltage (for example, 5 V at maximum), and starts slow charge of the battery 108 with power received from the external power supply device 102. At this time, the voltage of the battery 108 is, for example, lower than BATLEVEL1 (for example, 3.40 V).

In step S301, the charging control unit 107 supplies power received from the external power supply device 102 to the connected device determining unit 113, and activates the connected device determining unit 113. After activation, the connected device determining unit 113 uses the data lines 105 to determine whether the type of external power supply device 102 is the DCP, CDP, SDP, or etc. Then, the connected device determining unit 113 generates the determination result information indicating whether the type of external power supply device 102 is the DCP, CDP, SDP, or etc, and stores the generated determination result information in the memory in the connected device determining unit 113. After the determination result information is stored in the memory in the connected device determining unit 113, the charging control process advances to step S302.

In step S302, the voltage detecting unit 114 detects the voltage of the battery 108. After the voltage of the battery 108 is detected, the charging control process advances to step S303.

In step S303, the voltage detecting unit 114 determines whether the voltage (VBAT) detected in step S302 exceeds BATLEVEL1 (for example, 3.40 V). When the voltage detected in step S302 is equal to or lower than BATLEVEL1, the charging control process returns to step S302, and the charging control unit 107 continues the slow charge of the battery 108 until the voltage of the battery 108 exceeds BATLEVEL1. When the voltage detected in step S302 exceeds BATLEVEL1, the voltage detecting unit 114 notifies the charging control unit 107 that the voltage detected in step S302 exceeds BATLEVEL1, and the charging control process advances to step S304.

In step S304, the charging control unit 107 stops the slow charge of the battery 108. After the charging control unit 107 stops the slow charge of the battery 108, the charging control process advances to step S305.

In step S305, the charging control unit 107 starts supplying power from the battery 108 to the power supply control unit 115, and therefore the power supply control unit 115 is activated. Note that the charging control unit 107 supplies, to the power supply control unit 115, power from one or both of the external power supply device 102 and the battery 108. After the power supply control unit 115 is activated, the charging control process advances to step S306.

In step S306, the power supply control unit 115 starts supplying power from the charging control unit 107 to the main control unit 111, and therefore the main control unit 111 is activated. After the main control unit 111 is activated, the charging control process advances to step S307.

In step S307, the main control unit 111 obtains, from the memory 112, authentication result information indicating the unauthenticated state or the last authentication result. Then, the charging control process advances to step S308.

In step S308, the main control unit 111 determines whether the authentication result information obtained from the memory 112 indicates the authentication OK state, the authentication NG state, or the unauthenticated state. This determination is performed while charging of the battery 108 stops.

For example, in a state in which the battery authentication process is not performed after the battery device 110 is connected to the electronic device 101, the authentication result information indicates the unauthenticated state. If it is determined in step S308 that the authentication result information obtained from the memory 112 is information indicating the unauthenticated state, the charging control process advances to step S328.

For example, when the electronic device 101 is changed to a power supply OFF state in a state in which the battery device 110 remains connected to the electronic device 101 after it is determined that the battery device 110 is the genuine battery device in the last battery authentication process, the authentication result information indicates the authentication OK state. If it is determined in step S308 that the authentication result information obtained from the memory 112 is information indicating the authentication OK state, the charging control process advances to step S310.

For example, when the electronic device 101 is changed to the power supply OFF state in the state in which the battery device 110 remains connected to the electronic device 101 after it is determined that the battery device 110 is the non-genuine battery device (including the counterfeit battery device) in the last battery authentication process, the authentication result information indicates the authentication NG state. If it is determined in step S308 that the authentication result information obtained from the memory 112 is information indicating the authentication NG state, the charging control process advances to step S309.

In step S309, the main control unit 111 instructs the power supply control unit 115 to stop supplying power from the power supply control unit 115 to the main control unit 111, and therefore the electronic device 101 is changed to the power supply OFF state. In step S309, the battery device 110 is the non-genuine battery device (including the counterfeit battery device). Therefore, in step S309, the charging control process ends while charging of the battery 108 remains stopped for safety of the electronic device 101. Note that if the authentication result information obtained from the memory 112 is information indicating the authentication NG state, the charging control process stops regardless of the type of external power supply device 102.

In step S310, the main control unit 111 obtains the determination result information from the memory in the connected device determining unit 113. Then the charging control process advances to step S311.

In step S311, the main control unit 111 uses the determination result information obtained from the memory in the connected device determining unit 113 to determine whether the type of external power supply device 102 is the DCP, CDP, SDP, or etc. This determination is performed while charging of the battery 108 stops. If it is determined in step S311 that the type of external power supply device 102 is the etc, the charging control process advances to step S312. As an example in which the type of external power supply device 102 is the etc, a case is considered in which the external power supply device 102 is a power supply device incapable of supplying power to the electronic device 101 via the USB. If it is determined in step S311 that the type of external power supply device 102 is SDP, the charging control process advances to step S313. If it is determined in step S311 that the type of external power supply device 102 is the DCP or CDP, the charging control process advances to step S325.

In step S312, the main control unit 111 instructs the power supply control unit 115 to stop supplying power from the power supply control unit 115 to the main control unit 111, and therefore the electronic device 101 is changed to the power supply OFF state. In step S312, the battery device 110 is the genuine battery device, but the external power supply device 102 is the etc. Therefore, in step S312, the charging control process ends while charging of the battery 108 remains stopped for the safety of the electronic device 101.

In step S313, the main control unit 111 instructs the voltage detecting unit 114 to change a reference voltage level to be compared with the voltage of the battery 108 to BATLEVEL2 (for example, 3.55 V). After the reference voltage level is changed to BATLEVEL2, the charging control process advances to step S314.

In step S314, the main control unit 111 instructs the power supply control unit 115 to stop supplying power from the power supply control unit 115 to the main control unit 111, and therefore the electronic device 101 is changed to the power supply OFF state. Then, the charging control process advances to step S315.

In step S315, the charging control unit 107 receives, from the external power supply device 102, the first current (for example, 100 mA at maximum) and the predetermined voltage (for example, 5 V at maximum), and resumes the slow charge of the battery 108 with power received from the external power supply device 102. After the charging control unit 107 resumes the slow charge of the battery 108, the charging control process advances to step S316.

In step S316, the voltage detecting unit 114 detects the voltage of the battery 108. After the voltage of the battery 108 is detected, the charging control process advances to step S317.

In step S317, the voltage detecting unit 114 determines whether the voltage (VBAT) detected in step S316 exceeds BATLEVEL2 (for example, 3.55 V). In step S317, when the voltage detected in step S316 is equal to or lower than BATLEVEL2, the charging control process returns to step S316, and the charging control unit 107 continues the slow charge of the battery 108 until the voltage of the battery 108 exceeds BATLEVEL2. In step S317, when the voltage detected in step S316 exceeds BATLEVEL2, the voltage detecting unit 114 notifies the charging control unit 107 that the voltage detected in step S316 exceeds BATLEVEL2, and the charging control process advances to step S318.

In step S318, the charging control unit 107 stops the slow charge of the battery 108. After the charging control unit 107 stops the slow charge of the battery 108, the charging control process advances to step S319.

In step S319, the charging control unit 107 stops supplying power form the external power supply device 102 to the power supply control unit 115 and starts supplying power from the battery 108 to the power supply control unit 115, and therefore the power supply control unit 115 is activated. That is, the charging control unit 107 supplies power only from the battery 108 to the power supply control unit 115. After the power supply control unit 115 is activated, the charging control process advances to step S320.

In step S320, the power supply control unit 115 starts supplying power from the charging control unit 107 to the main control unit 111, and therefore the main control unit 111 is activated. After the main control unit 111 is activated, the charging control process advances to step S321.

In step S321, the main control unit 111 performs enumeration between the main control unit 111 and the external power supply device 102. The main control unit 111 obtains power supply capability information of the external power supply device 102 from the external power supply device 102 by performing enumeration between the main control unit 111 and the external power supply device 102. The power supply capability information of the external power supply device 102 contains information on the power supply capability of the external power supply device 102. After enumeration ends normally, the main control unit 111 can perform data communication with the external power supply device 102. After enumeration ends normally, the charging control process advances to step S322. Note in step S321, the main control unit 111 performs enumeration with power only from the battery 108.

In step S322, the main control unit 111 uses the power supply capability information obtained in step S321 to determine whether the power supply capability of the external power supply device 102 is "High Power" or "Low Power". If the power supply capability of the external power supply device 102 is "Low Power", the external power supply device 102 can supply, to the electronic device 101, the first current (for example, 100 mA at maximum) and the predetermined voltage (for example, 5 V at maximum). If the power supply capability of the external power supply device 102 is "High Power", the external power supply device 102 can supply, to the electronic device 101, a current (for example, 500 mA at maximum) at the second current level higher than the first current level and the predetermined voltage (for example, 5 V at maximum). If it is determined in step S322 that the power supply capability of the external power supply device 102 is "Low Power", the charging control process advances to step S323. If it is determined in step S322 that the power supply capability of the external power supply device 102 is "High Power", the charging control process advances to step S325.

In step S323, the main control unit 111 instructs the power supply control unit 115 to stop supplying power from the power supply control unit 115 to the main control unit 111, and therefore the electronic device 101 is changed to the power supply OFF state. Then, the charging control process advances to step S324.

In step S324, the charging control unit 107 receives, from the external power supply device 102, the first current (for example, 100 mA at maximum) and the predetermined voltage (for example, 5 V at maximum), and resumes the slow charge of the battery 108 slowly with power received from the external power supply device 102. Then, the charging control unit 107 continues the slow charge of the battery 108 until the voltage of the battery 108 reaches the fully charged voltage (for example, 4.20 V), and the charging control process ends when the voltage of the battery 108 reaches the fully charged voltage. However, if an abnormal state occurs during the slow charge of the battery 108, the charging control process ends immediately for the safety of the electronic device 101. Note that in step S324, the battery device 110 is the genuine battery device, and the external power supply device 102 is not the etc but the SDP. The SDP is the external power supply device defined by the BCS 1.2 standard. Thus, the electronic device 101 is safe even if the slow charge of the battery 108 is continued until the voltage of the battery 108 reaches the fully charged voltage in step S324.

In step S325, the main control unit 111 instructs the charging control unit 107 to receive, from the external power supply device 102, the second current (for example, 500 mA at maximum) and the predetermined voltage (for example, 5 V at maximum). After the charging control unit 107 starts receiving, from the external power supply device 102, the second current (for example, 500 mA at maximum) and the predetermined voltage (for example, 5 V at maximum), the charging control process advances to step S326.

In step S326, the main control unit 111 instructs the power supply control unit 115 to stop supplying power from the power supply control unit 115 to the main control unit 111, and therefore the electronic device 101 is changed to the power supply OFF state. Then, the charging control process advances to step S327.

In step S327, the charging control unit 107 receives, from the external power supply device 102, the second current (for example, 500 mA at maximum) and the predetermined voltage (for example, 5 V at maximum), and starts quick charge of the battery 108 with power received from the external power supply device 102. Then, the charging control unit 107 continues the quick charge of the battery 108 until the voltage of the battery 108 reaches the fully charged voltage (for example, 4.20 V), and the charging control process ends when the voltage of the battery 108 reaches the fully charged voltage. However, if the abnormal state occurs during the quick charge of the battery 108, the charging control process ends immediately for the safety of the electronic device 101. Note that in step S327, the battery device 110 is the genuine battery device, and the external power supply device 102 is not the etc but the SDP. The SDP is the external power supply device defined by the BCS 1.2 standard. Thus, the electronic device 101 is safe even if the quick charge of the battery 108 is continued until the voltage of the battery 108 reaches the fully charged voltage in step S327.

In step S328, the main control unit 111 obtains the determination result information from the memory in the connected device determining unit 113. Then, the charging control process advances to step S329.

In step S329, the main control unit 111 uses the determination result information obtained from the memory in the connected device determining unit 113 to determine whether the type of external power supply device 102 is the DCP, CDP, SDP, or etc. This determination is performed while charging of the battery 108 stops. If it is determined in step S329 that the type of external power supply device 102 is the etc, the charging control process advances to step S330. If it is determined in step S329 that the type of external power supply device 102 is the DCP, CDP, or SDP, the charging control process advances to step S331.

In step S330, the main control unit 111 instructs the power supply control unit 115 to stop supplying power from the power supply control unit 115 to the main control unit 111, and therefore the electronic device 101 is changed to the power supply OFF state. In step S330, the battery device 110 is the non-genuine battery device (including the counterfeit battery device), and the external power supply device 102 is the etc. Therefore, in step S330, the charging control process ends while charging of the battery 108 remains stopped for safety of the electronic device 101.

In step S331, the main control unit 111 instructs the voltage detecting unit 114 to change the reference voltage level to be compared with the voltage of the battery 108 to BATLEVEL3 (for example, 3.60 V). After the reference voltage level is changed to BATLEVEL3, the charging control process advances to step S332.

In step S332 the main control unit 111 instructs the power supply control unit 115 to stop supplying power from the power supply control unit 115 to the main control unit 111, and therefore the electronic device 101 is changed to the power supply OFF state. Then, the charging control process advances to step S333.

In step S333, the charging control unit 107 receives, from the external power supply device 102, the first current (for example, 100 mA at maximum) and the predetermined voltage (for example, 5 V at maximum), and resumes the slow charge of the battery 108 with power received from the external power supply device 102. After the charging control unit 107 resumes the slow charge of the battery 108, the charging control process advances to step S334.

In step S334, the voltage detecting unit 114 detects the voltage of the battery 108. After the voltage of the battery 108 is detected, the charging control process advances to step S335.

In step S335, the voltage detecting unit 114 determines whether the voltage (VBAT) detected in step S334 exceeds BATLEVEL3 (for example, 3.60 V). In step S335, when the voltage detected in step S334 is equal to or lower than BATLEVEL3, the charging control process returns to step S334, and the charging control unit 107 continues the slow charge of the battery 108 until the voltage of the battery 108 exceeds BATLEVEL3. In step S335, when the voltage detected in step S334 exceeds BATLEVEL3, the voltage detecting unit 114 notifies the charging control unit 107 that the voltage detected in step S334 exceeds BATLEVEL3, and the charging control process advances to step S336.

In step S336, the charging control unit 107 stops the slow charge of the battery 108. After the charging control unit 107 stops the slow charge of the battery 108, the charging control process advances to step S337.

In step S337, the charging control unit 107 stops supplying power form the external power supply device 102 to the power supply control unit 115 and starts supplying power from the battery 108 to the power supply control unit 115, and therefore the power supply control unit 115 is activated. That is, the charging control unit 107 supplies power only from the battery 108 to the power supply control unit 115. After the power supply control unit 115 is activated, the charging control process advances to step S338.

In step S338, the power supply control unit 115 starts supplying power from the charging control unit 107 to the main control unit 111, and therefore the main control unit 111 is activated. After the main control unit 111 is activated, the charging control process advances to step S339.

In step S339, the main control unit 111 performs, between the main control unit 111 and the authentication unit 109, the battery authentication process for determining whether the battery device 110 is the genuine battery device. Note in step S339, the main control unit 111 performs the battery authentication process with power only from the battery 108.

In step S340, the main control unit 111 determines whether a result of the battery authentication process performed in step S339 is the authentication OK state or the authentication NG state. This determination is performed while charging of the battery 108 stops. If it is determined that the battery device 110 is the non-genuine battery device (including the counterfeit battery device) (if the result is the authentication NG state), the charging control process advances from step S340 to step S341. If it is determined that the battery device 110 is the genuine battery device (if the result is the authentication OK state), the charging control process advances to step S343.

In step S341, the main control unit 111 changes the authentication result information stored in the memory 112 to the information indicating the authentication NG state. Consequently, the authentication result information indicating the authentication NG state is stored in the memory 112. After the authentication result information indicating the authentication NG state is stored in the memory 112, the charging control process advances to step S342.

In step S342, the main control unit 111 instructs the power supply control unit 115 to stop supplying power from the power supply control unit 115 to the main control unit 111, and therefore the electronic device 101 is changed to the power supply OFF state. In step S342, the battery device 110 is the non-genuine battery device (including the counterfeit battery device). Therefore, in step S342, the charging control process ends while charging of the battery 108 remains stopped for the safety of the electronic device 101. Thus, if the result of the battery authentication process performed in step S339 is the authentication NG state, the charging control process stops regardless of the type of external power supply device 102 (S340-S342).

In step S343, the main control unit 111 changes the authentication result information stored in the memory 112 to the information indicating the authentication OK state. Consequently, the authentication result information indicating the authentication OK state is stored in the memory 112. After the authentication result information indicating the authentication OK state is stored in the memory 112, the charging control process advances to step S344.

In step S344, the main control unit 111 uses the determination result information obtained from the memory in the connected device determining unit 113 to determine whether the type of external power supply device 102 is the DCP, CDP, or SDP. If it is determined in step S344 that the type of external power supply device 102 is the DCP or CDP, the charging control process advances to step S325. If it is determined in step S344 that the type of external power supply device 102 is the SDP, the charging control process advances to step S321.

An example of the relationship between a charging time and the voltage of the battery 108 will now be described with reference to FIGS. 2 and 4.

Figure 2:
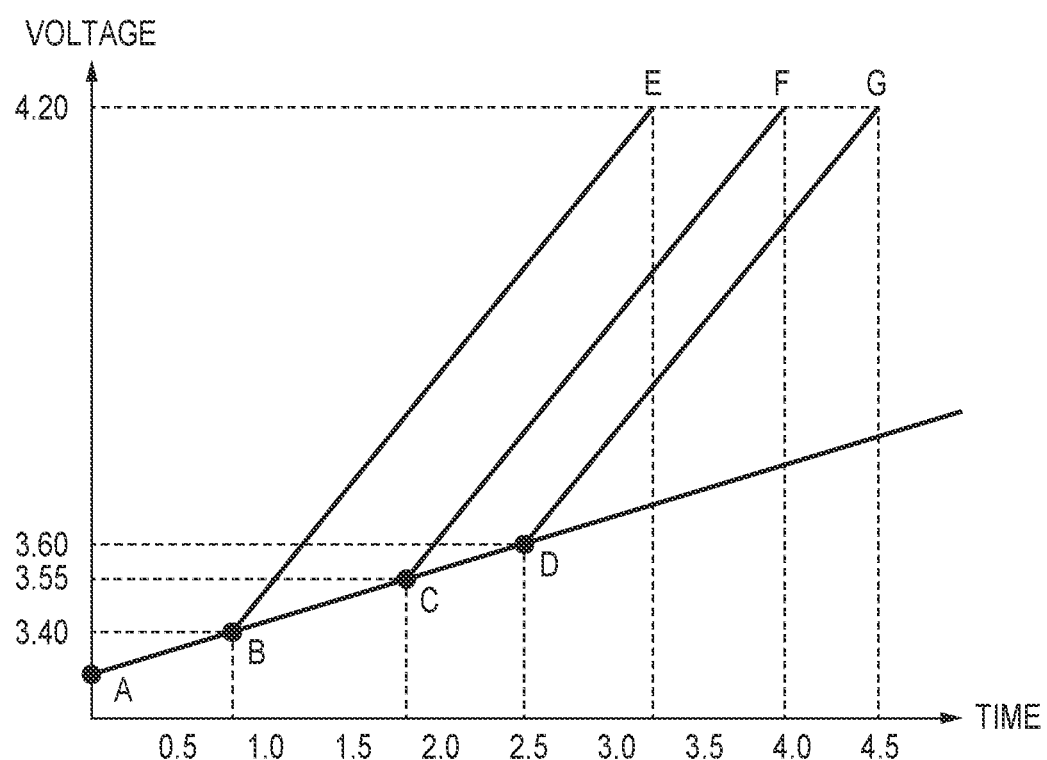
FIG. 2 is a graph illustrating a charging control process performed in the electronic device 101.

In an example shown in FIG. 2, the voltage of the battery 108 obtained when the external power supply device 102 is connected to the electronic device 101 via the USB cable 103 is, for example, lower than BATLEVEL1 (for example, 3.40 V) (point A of FIG. 2). Then, when the electronic device 101 and the external power supply device 102 are connected, the charging control unit 107 starts slow charge of the battery 108 (see step S301 of FIG. 3A). The slow charge of the battery 108 is continued until the voltage of the battery 108 reaches point B (corresponding to BATLEVEL1) of FIG. 2 from point A of FIG. 2 (see steps S302 and S303 of FIG. 3A).

Figure 3A:
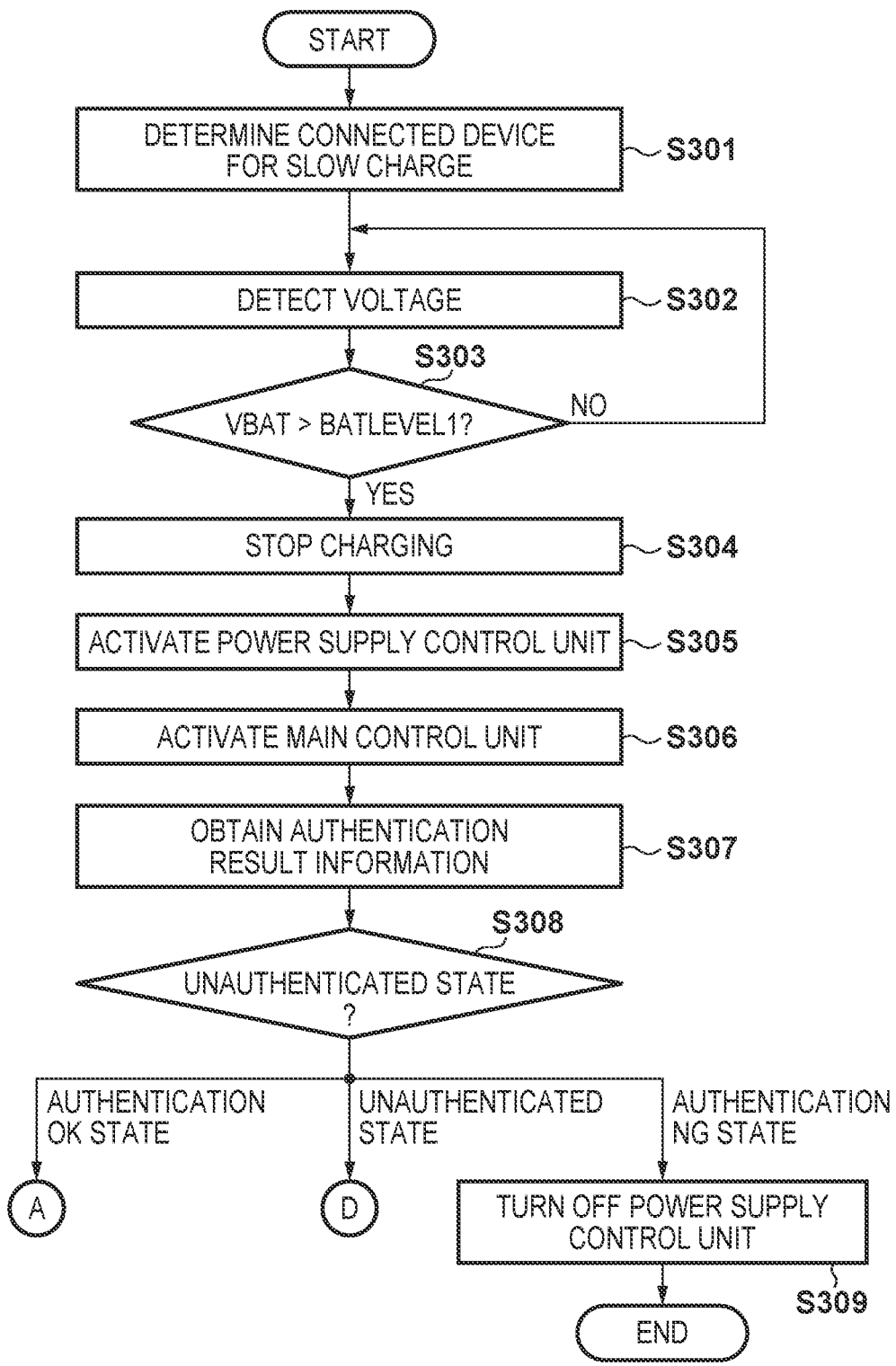
FIG. 3A is a flowchart illustrating the charging control process performed in the electronic device 101.

If the voltage of the battery 108 exceeds BATLEVEL1, the slow charge of the battery 108 stops at point B of FIG. 2 (see step S304 of FIG. 3A). Then, while charging of the battery 108 stops, the main control unit 111 determines whether the authentication result information obtained from the memory 112 is the authentication OK state, the authentication NG state, or the unauthenticated state (see steps S305 to S308 of FIG. 3A).

If the authentication result information obtained from the memory 112 is information indicating the authentication NG state, the charging control process ends while charging of the battery 108 remains stopped at point B of FIG. 2 (see step S309 of FIG. 3A and the row of "authentication NG state" of FIG. 4). Note that if the authentication result information obtained from the memory 112 is information indicating the authentication NG state, charging of the battery 108 stops regardless of the type of external power supply device 102.

Figure 3B:
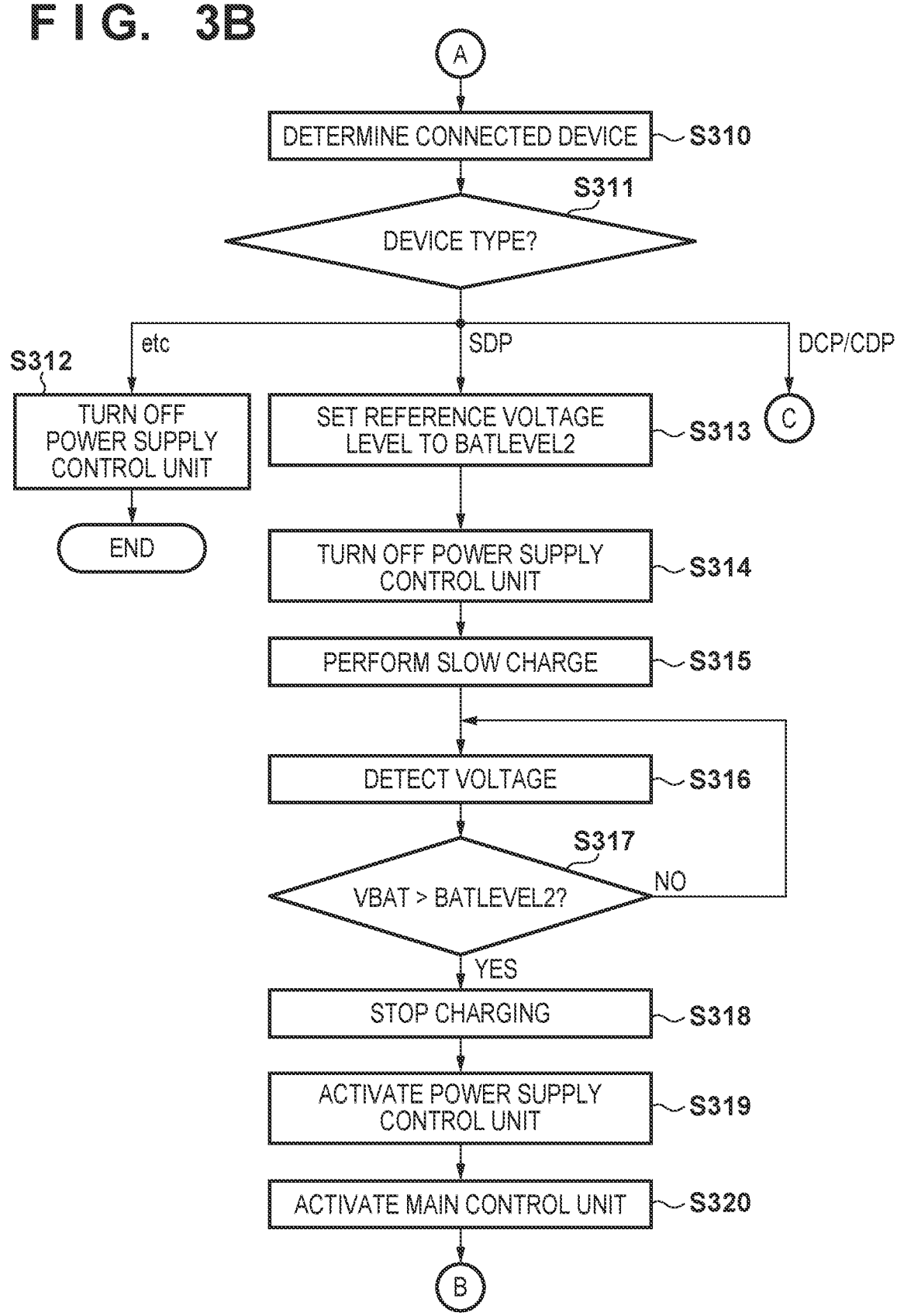
FIG. 3B is a flowchart illustrating the charging control process performed in the electronic device 101.

If the authentication result information obtained from the memory 112 is information indicating the authentication OK state, the main control unit 111 determines whether the type of external power supply device 102 is the DCP, CDP, SDP, or etc (see steps S310 and S311 of FIG. 3B).

If the authentication result information is information indicating the authentication OK state, and the type of external power supply device 102 is the etc, the charging control process ends while charging of the battery 108 remains stopped at point B of FIG. 2 (see step S312 of FIG. 3B and "etc" in a row of "authentication OK state" of FIG. 4).

Figure 3C:
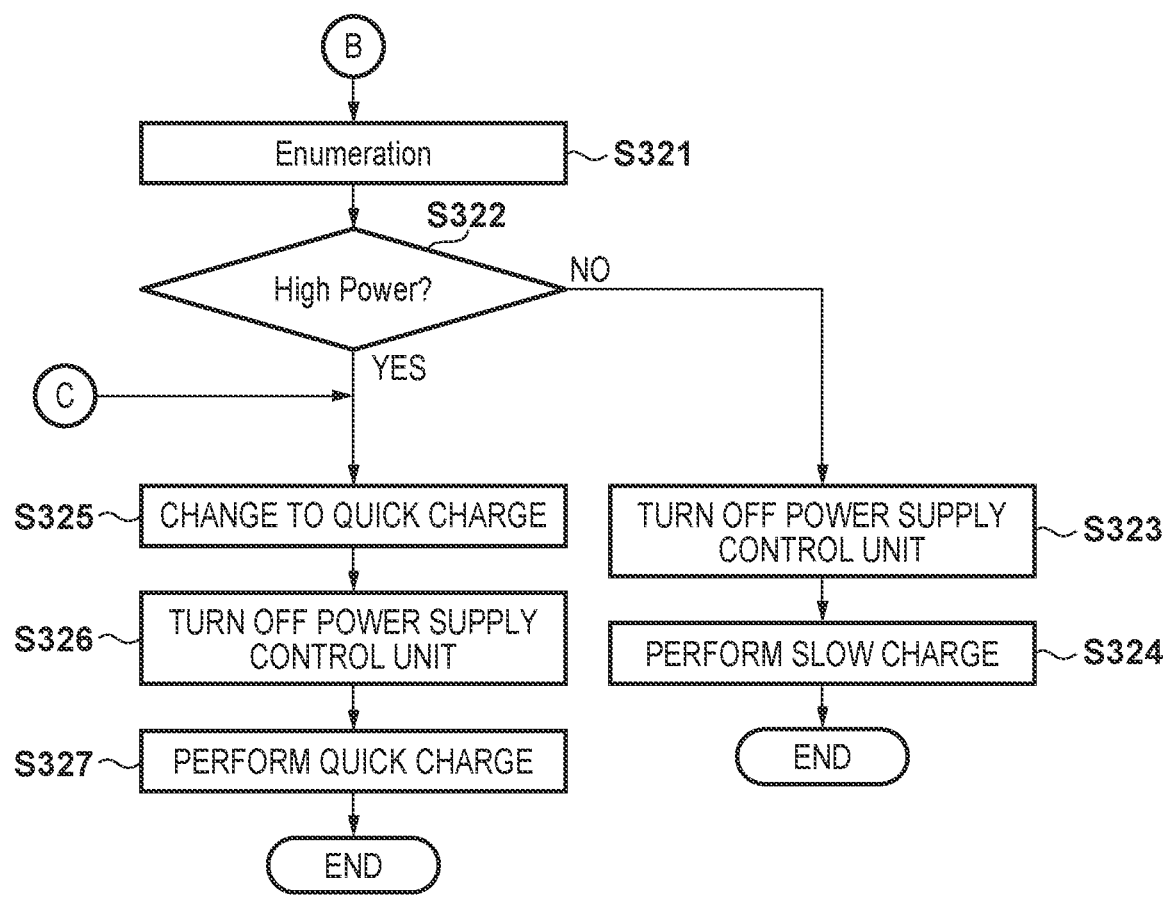
FIG. 3C is a flowchart illustrating the charging control process performed in the electronic device 101.

If the authentication result information is information indicating the authentication OK state, and the type of external power supply device 102 is the DCP or CDP, the charging control unit 107 starts quick charge of the battery 108 (see steps S325 to S327 of FIG. 3C). The quick charge of the battery 108 is continued until the voltage of the battery 108 reaches point E (corresponding to the fully charged voltage) of FIG. 2 from point B of FIG. 2 (see step S327 of FIG. 3C and "DCP, CDP" in a row of "authentication OK state" of FIG. 4). As described above, if the authentication result information is information indicating the authentication OK state, and the type of external power supply device 102 is the DCP or CDP, it is possible to perform the quick charge of the battery 108 from point B of FIG. 2. When the quick charge of the battery 108 is performed from point B of FIG. 2, the charging time can be shortened by about one and half hours as compared with a case in which the quick charge of the battery 108 is performed from point D of FIG. 2.

If the authentication result information is information indicating the authentication OK state, and the type of external power supply device 102 is the SDP, the charging control unit 107 resumes the slow charge of the battery 108 (see steps S313 to S315 of FIG. 3B and "SDP" in a row of "authentication OK state" of FIG. 4). The slow charge of the battery 108 is continued until the voltage of the battery 108 reaches point C (corresponding to BATLEVEL2 (for example, 3.55 V)) of FIG. 2 from point B of FIG. 2 (see steps S316 and S317 of FIG. 3B).

If the voltage of the battery 108 exceeds BATLEVEL2, the slow charge of the battery 108 stops at point C of FIG. 2 (see step S318 of FIG. 3B). Then, while charging of the battery 108 stops, the main control unit 111 determines whether the power supply capability of the external power supply device 102 is "High Power" or "Low Power" (see steps S319 and S320 of FIG. 3B, and steps S321 and S322 of FIG. 3C).

If the authentication result information is information indicating the authentication OK state, the type of external power supply device 102 is the SDP, and the power supply capability of the external power supply device 102 is "Low Power", the charging control unit 107 resumes the slow charge of the battery 108 (see steps S323 and S324 of FIG. 3C). The slow charge of the battery 108 is continued until the voltage of the battery 108 reaches the fully charged voltage from point C of FIG. 2 (see step S324 of FIG. 3C and "SDP" in a row of "authentication OK state" of FIG. 4).

If the authentication result information is information indicating the authentication OK state, the type of external power supply device 102 is the SDP, and the power supply capability of the external power supply device 102 is "High Power", the charging control unit 107 starts the quick charge of the battery 108 (see steps S325 to S327 of FIG. 3C). The quick charge of the battery 108 is continued until the voltage of the battery 108 reaches point F (corresponding to the fully charged voltage) of FIG. 2 from point C of FIG. 2 (see step S327 of FIG. 3C and "SDP" in the row of "authentication OK state" of FIG. 4). As described above, if the authentication result information is information indicating the authentication OK state, the type of external power supply device 102 is the SDP, and the power supply capability of the external power supply device 102 is "High Power", it is possible to perform the quick charge of the battery 108 from point C of FIG. 2. When the quick charge of the battery 108 is performed from point C of FIG. 2, the charging time can be shortened by about 30 min as compared with the case in which the quick charge of the battery 108 is performed from point D of FIG. 2.

On the other hand, if the authentication result information obtained from the memory 112 is information indicating the unauthenticated state, the main control unit 111 determines whether the type of external power supply device 102 is the DCP, CDP, SDP, or etc (see steps S328 and S329 of FIG. 3D).

If the authentication result information is information indicating the unauthenticated state, and the type of external power supply device 102 is the etc, the charging control process ends while charging of the battery 108 remains stopped at point B of FIG. 2 (see step S330 of FIG. 3D and "etc" in a row of "unauthenticated state" of FIG. 4).

If the authentication result information is information indicating the unauthenticated state, and the type of external power supply device 102 is the DCP, CDP, or SDP, the charging control unit 107 resumes the slow charge of the battery 108 (see steps S331 to S333 of FIG. 3D). The slow charge of the battery 108 is continued until the voltage of the battery 108 reaches point D (corresponding to BATLEVEL3 (for example, 3.60 V)) of FIG. 2 from point C of FIG. 2 (see steps S334 and S335 of FIG. 3D, and "DCP, CDP" and "SDP" in rows of "unauthenticated state" of FIG. 4).

If the voltage of the battery 108 exceeds BATLEVEL3, the slow charge of the battery 108 stops at point D of FIG. 2 (see step S336 of FIG. 3D). Then, while charging of the battery 108 stops, the main control unit 111 performs the battery authentication process for determining whether the battery device 110 is the genuine battery device and determines whether the result of the battery authentication process is the authentication OK state or the authentication NG state (see steps S337 and S338 of FIG. 3D, and steps S339 and S340 of FIG. 3E).

Figure 3E:
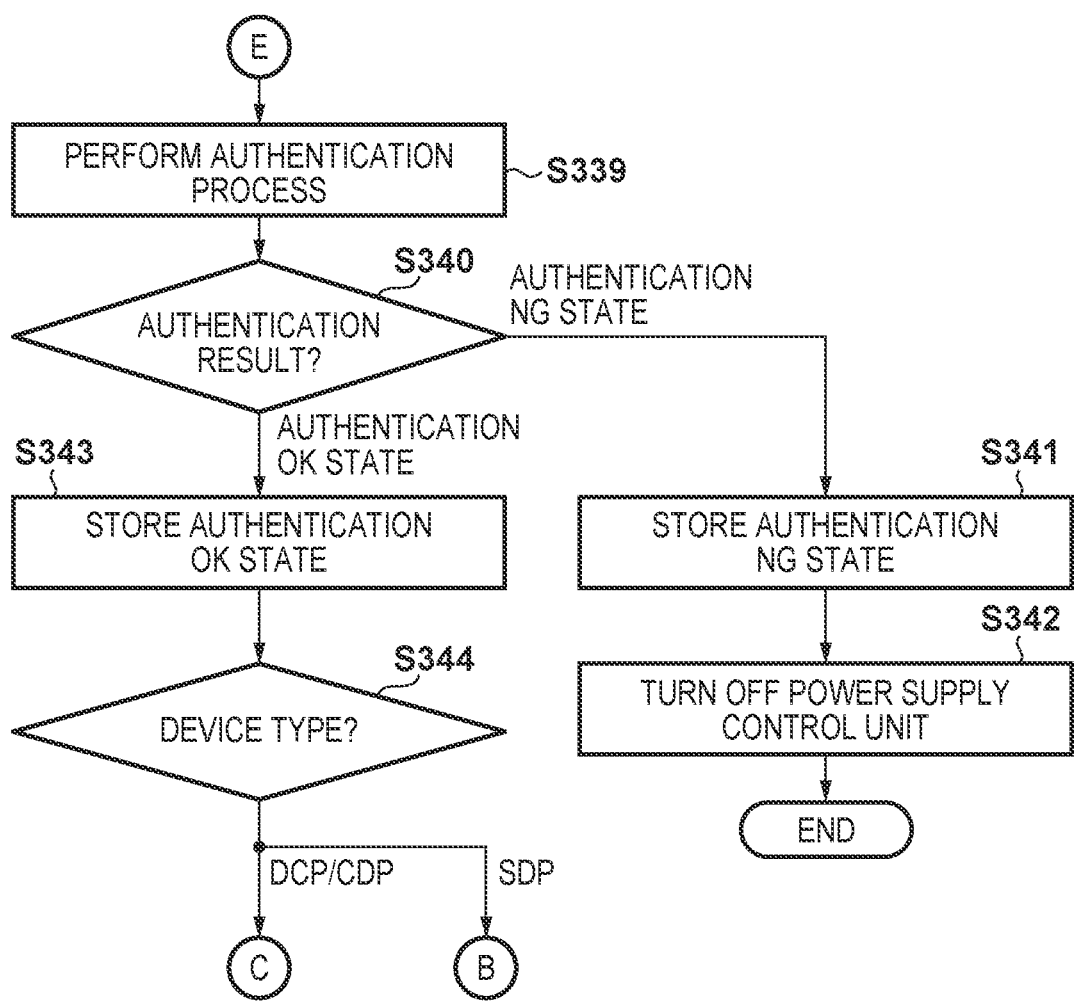
FIG. 3E is a flowchart illustrating the charging control process performed in the electronic device 101.

If the result of the battery authentication process is the authentication NG state, the charging control process ends while charging of the battery 108 remains stopped at point D of FIG. 2 (see steps S341 and S342 of FIG. 3E, and "authentication NG state" of "DCP, CDP" and "SDP" in the rows of "unauthenticated state" of FIG. 4). Note that if the result of the battery authentication process is the authentication NG state, charging of the battery 108 stops regardless of the type of external power supply device 102.

If the result of the battery authentication process is the authentication OK state, the main control unit 111 determines whether the type of external power supply device 102 is the DCP, CDP, or SDP (see steps S343 and S344 of FIG. 3E).

If the result of the battery authentication process is the authentication OK state, and the type of external power supply device 102 is the DCP or CDP, the charging control unit 107 starts the quick charge of the battery 108 (see steps S325 to S327 of FIG. 3C). The quick charge of the battery 108 is continued until the voltage of the battery 108 reaches point G (corresponding to the fully charged voltage) of FIG. 2 from point D of FIG. 2 (see step S327 of FIG. 3C and "authentication OK state" of "DCP, CDP" in a row of "unauthenticated state" of FIG. 4).

If the result of the battery authentication process is the authentication OK state, and the type of external power supply device 102 is the SDP, the main control unit 111 determines whether the power supply capability of the external power supply device 102 is "High Power" or "Low Power" while charging of the battery 108 stops (see steps S319 and S320 of FIG. 3B, and steps S321 and S322 of FIG. 3C).

If the result of the battery authentication process is the authentication OK state, the type of external power supply device 102 is the SDP, and the power supply capability of the external power supply device 102 is "Low Power", the charging control unit 107 resumes the slow charge of the battery 108 (see steps S323 and S324 of FIG. 3C). The slow charge of the battery 108 is continued until the voltage of the battery 108 reaches the fully charged voltage from point D of FIG. 2 (see step S324 of FIG. 3C and the row "authentication OK state" of "SDP" in the row of "unauthenticated state" of FIG. 4).

If the result of the battery authentication process is the authentication OK state, the type of external power supply device 102 is the SDP, and the power supply capability of the external power supply device 102 is "High Power", the charging control unit 107 starts the quick charge of the battery 108 (see steps S325 to S327 of FIG. 3C). The quick charge of the battery 108 is continued until the voltage of the battery 108 reaches point G (corresponding to the fully charged voltage) of FIG. 2 from point D of FIG. 2 (see step S327 of FIG. 3C and "authentication OK state" of "SDP" in the row of "unauthenticated state" of FIG. 4).

As described above, according to the charging control process of the electronic device 101, when the quick charge of the battery 108 is performed from point B of FIG. 2, the charging time can be shortened by about one and half hours as compared with the case in which the quick charge of the battery 108 is performed from point D of FIG. 2. Furthermore, when the quick charge of the battery 108 is performed from point C of FIG. 2, the charging time can be shortened by about 30 min as compared with the case in which the quick charge of the battery 108 is performed from point D of FIG. 2.

Second Embodiment

A personal computer, a microcomputer, a CPU (central processing unit), or the like can also implement, by using a program, various functions, processes, and methods described in the first embodiment. In the second embodiment, the personal computer, the microcomputer, a microprocessor, the CPU (central processing unit), or the like is referred to as "computer X" hereinafter. Further, in the second embodiment, a program for controlling computer X, and for implementing various functions, processes, and methods described in the first embodiment is referred to as "program Y".

Computer X executes program Y to implement various functions, processes, and methods described in the first embodiment. In this case, program Y is supplied to computer X via a computer readable storage medium. The computer readable storage medium in the second embodiment includes at least one of a hard disk apparatus, a magnetic storage, an optical storage, a magneto-optical storage, a memory card, a volatile memory, non-volatile memory, and the like. The computer readable storage medium in the second embodiment is a non-transitory storage medium.

While aspects of the present invention are described with reference to exemplary embodiments, it is to be understood that the aspects of the invention are not limited to the exemplary embodiments. The scope of the following claims is to be accorded the broadest interpretation so as to encompass all such modifications and equivalent structures.

This application claims priority from Japanese Patent Application No. 2015-248027, filed Dec. 18, 2015, which is hereby incorporated by reference herein in its entirety.

What is claimed is:

1. An electronic device comprising:
a charging control unit that charges a battery included in a battery device with power supplied from an external device to the electronic device;
an authentication unit that authenticates whether the battery device is a predetermined battery device;
a memory that stores an authentication result indicating whether the battery device is the predetermined battery device; and
a control unit that controls the charging control unit to change a charging mode of the charging control unit from a slow charging mode to a fast charging mode, in a case where a voltage level of the battery exceeds a first voltage level lower than a second voltage level when the charging control unit is in the slow charging mode, the authentication result stored in the memory indicates that the battery device is the predetermined battery device, and a type of the external device is a first type or a second type.

2. The electronic device according to claim 1, wherein the control unit causes the charging control unit to charge the battery in the slow charging mode, in a case where a voltage level of the battery exceeds the first voltage level when the charging control unit is in the slow charging mode, the authentication result stored in the memory indicates that the battery device is the predetermined battery device, and the type of the external device is a third type.

3. The electronic device according to claim 2, wherein the control unit determines whether the external device is capable of supplying high power or low power, in a case where the authentication result stored in the memory indicates that the battery device is the predetermined battery device, the type of the external device is the third type, and a voltage level of the battery exceeds the second voltage level when the charging control unit is in the slow charging mode.

4. The electronic device according to claim 3, wherein the control unit causes the charging control unit to charge the battery in the slow charging mode, in a case where the control unit determines that the external device is capable of supplying low power.

5. The electronic device according to claim 3, wherein the control unit controls the charging control unit to change the charging mode of the charging control unit from the slow charging mode to the fast charging mode, in a case where the control unit determines that the external device is capable of supplying high power.

6. The electronic device according to claim 2, wherein the third type is an SDP (Standard Downstream Port).

7. The electronic device according to claim 1, wherein charging the battery in the slow charging mode ends regardless of the type of the external device, in a case where a voltage level of the battery exceeds the first voltage level when the charging control unit is in the slow charging mode, and the authentication result stored in the memory indicates that the battery device is not the predetermined battery device.

8. The electronic device according to claim 1, wherein the authentication result stored in the memory is deleted in accordance with removal of the battery device.

9. The electronic device according to claim 1, wherein the external device is connected to the electronic device via a USB.

10. The electronic device according to claim 1, wherein the electronic device is capable of acting as an imaging device.

11. The electronic device according to claim 1, wherein the electronic device is capable of acting as a mobile phone.

12. The electronic device according to claim 1, wherein the first type is a DCP (Dedicated Charging Port), and the second type is a CDP (Charging Downstream Port).

13. A method comprising:
   causing a charging control unit to charge a battery included in a battery device with power supplied from an external device to an electronic device;
   authenticating whether the battery device is a predetermined battery device;
   storing, in a memory, an authentication result indicating whether the battery device is the predetermined battery device; and
   controlling the charging control unit to change a charging mode of the charging control unit from a slow charging mode to a fast charging mode, in a case where a voltage level of the battery exceeds a first voltage level lower than a second voltage level when the charging control unit is in the slow charging mode, the authentication result stored in the memory indicates that the battery device is the predetermined battery device, and a type of the external device is a first type or a second type.

14. The method according to claim 13, further comprising:
   causing the charging control unit to charge the battery in the slow charging mode, in a case where a voltage level of the battery exceeds the first voltage level when the charging control unit is in the slow charging mode, the authentication result stored in the memory indicates that the battery device is the predetermined battery device, and the type of the external device is a third type.

15. The method according to claim 14, further comprising:
   determining whether the external device is capable of supplying high power or low power, in a case where the authentication result stored in the memory indicates that the battery device is the predetermined battery device, the type of the external device is the third type, and a voltage level of the battery exceeds the second voltage level when the charging control unit is in the slow charging mode.

16. The method according to claim 15, further comprising:
   causing the charging control unit to charge the battery in the slow charging mode, in a case where the external device is capable of supplying low power.

17. The method according to claim 15, further comprising:
   controlling the charging control unit to change the charging mode of the charging control unit from the slow charging mode to the fast charging mode, in a case where the external device is capable of supplying high power.

18. The method according to claim 14, wherein the third type is an SDP (Standard Downstream Port).

19. The method according to claim 13, wherein charging the battery in the slow charging mode ends regardless of the type of the external device, in a case where a voltage level of the battery exceeds the first voltage level when the charging control unit is in the slow charging mode, and the authentication result stored in the memory indicates that the battery device is not the predetermined battery device.

20. The method according to claim 13, wherein the first type is a DCP (Dedicated Charging Port), and the second type is a CDP (Charging Downstream Port).

* * * * *